No. 757,143. PATENTED APR. 12, 1904.
J. J. REILLY.
FLEXIBLE PIPE COUPLING.
APPLICATION FILED JAN. 6, 1902.
NO MODEL. 2 SHEETS—SHEET 1.
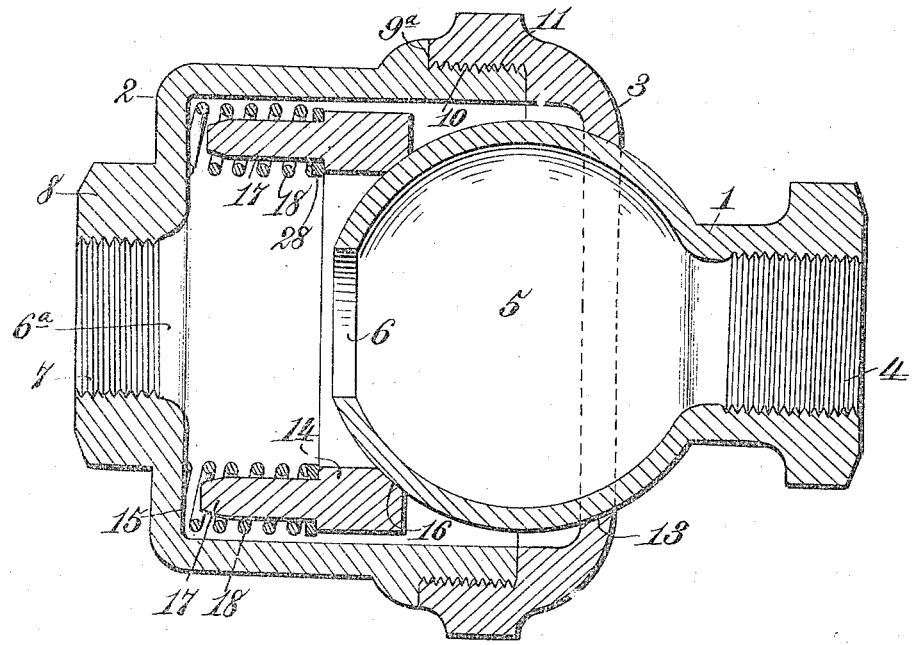
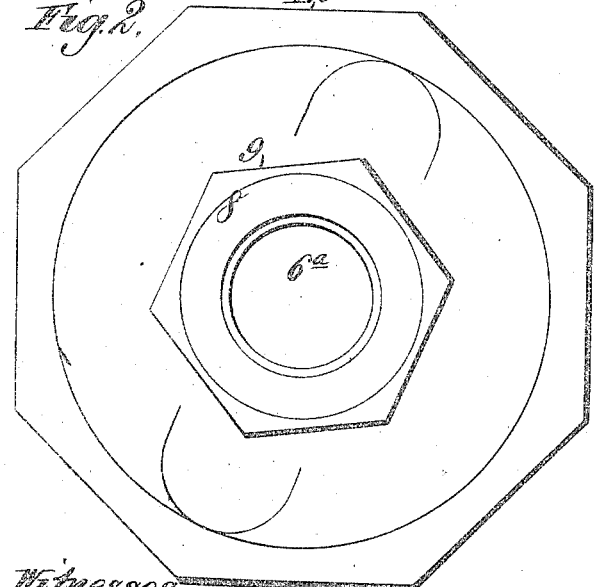
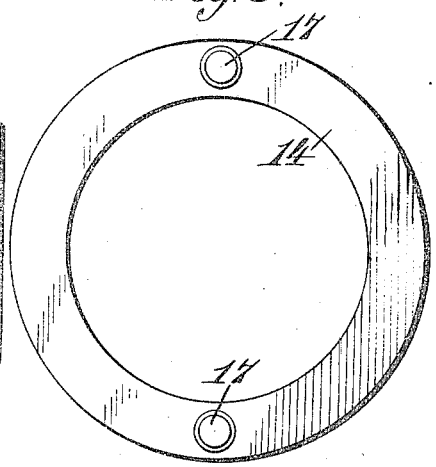
Inventor
John J. Reilly.

No. 757,143. PATENTED APR. 12, 1904.
J. J. REILLY.
FLEXIBLE PIPE COUPLING.
APPLICATION FILED JAN. 6, 1902.
NO MODEL. 2 SHEETS—SHEET 2.
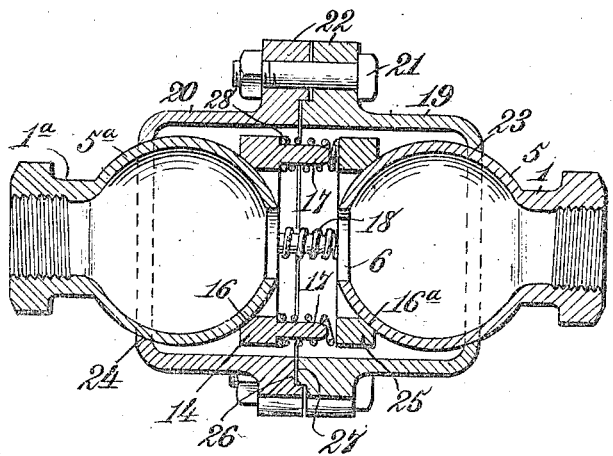
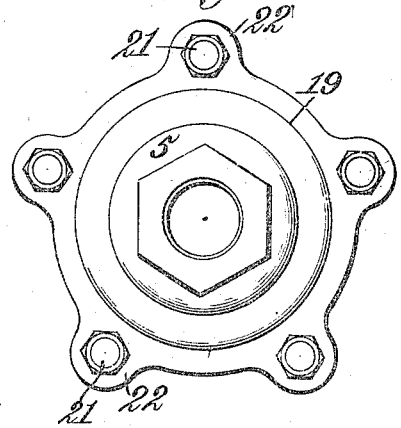
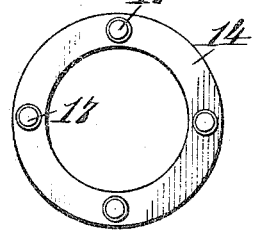
Witnesses.
Inventor.
John J. Reilly.
By No. 757,143. Patented April 12, 1904.

UNITED STATES PATENT OFFICE.

JOHN J. REILLY, OF LOUISVILLE, KENTUCKY.

FLEXIBLE PIPE-COUPLING.

SPECIFICATION forming part of Letters Patent No. 757,143, dated April 12, 1904.

Application filed January 6, 1902. Serial No. 88,634. (No model.)

*To all whom it may concern:*

Be it known that I, JOHN J. REILLY, a citizen of the United States of America, residing at Louisville, in the county of Jefferson and State of Kentucky, have invented certain new and useful Improvements in Flexible Pipe-Couplings, of which the following is a specification.

My invention relates to flexible pipe-couplings of the ball-and-socket type, the same residing in a novel construction and arrangement of parts whereby a close joint may be maintained at all times between the two parts of the coupling in any positions to which they may be turned with respect to each other.

The object of the invention is to provide novel means whereby the two parts of the coupling are held in spring-contact with each other, so as to maintain a close joint at all times to prevent the entrance of moisture to the bearing parts of the joint and the consequent formation of rust on said parts, which would affect the joint and render it open and leaky.

Other objects and advantages of the invention will hereinafter appear, and the novel features thereof will be set forth in the claims.

In the drawings forming part of this specification, Figure 1 is a longitudinal sectional view of a pipe-coupling constructed in accordance with my invention. Fig. 2 is an end view of the same. Fig. 3 is an elevation of the presser-block on which the springs act to maintain the two parts of the coupling in close contact with each other at the joint. Fig. 4 is a longitudinal sectional view showing as a modification what I term a "duplex" coupling. Fig. 5 is an end view of the same, and Fig. 6 is an elevation of the presser-block employed.

Like reference-numerals indicate like parts in the different views.

My improved coupling is made up of the sections 1 and 2 and the cap 3. The section 1 is what may be termed the "ball-section," the same being provided with internal screwthreads 4 at one end for connection therewith of one end of the pipe and with a ball or spherical enlargement 5 at the opposite end. Said ball 5 is hollow and has an opening 6 leading therefrom. The opening 6 may be disposed otherwise than as herein shown, and more than one opening may be formed in the ball 5, if desired. I may also provide other means than the screw-threads 4 for the connection of the end of the pipe with the section 1. The section 2 constitutes what may be termed the "socket-section," the same consisting of a hollow shell or casing having a central opening $6^a$ leading thereinto and internal screw-threads 7 for the attachment of the other end of the pipe to be coupled. For the screw-threads 7, however, any other suitable pipe-attaching means may be substituted. The opening $6^a$ extends through a boss 8, which is provided with polygonal faces 9 for the application of a wrench or other similar device. The outer surface of the enlarged portion of section 2 is formed with an annular shoulder $9^a$ and adjacent to said shoulder with external screwthreads 10. The cap 3 is provided with internal screw-threads 11, corresponding with the screw-threads 10 and adapted to mesh therewith. When the parts of the device are in place, the cap 3 is screwed up upon the enlarged end of the section 2 and abuts against the shoulder $9^a$, so as to produce a close joint at this point. To facilitate the turning of the cap 3, the same is provided with polygonal faces 12 for the application of a wrench, as clearly shown in Fig. 2 of the drawings. The cap 3 is provided with a bearing-surface 13 around its central opening, which is ground to correspond with the exterior spherical surface of the ball 5, so that when these parts are in contact with each other a close impervious joint will be produced. As the exterior surface of the ball 5 is spherical and as the bearing-surface 13 is correspondingly shaped, it will be obvious that the two sections of the coupling may be turned with respect to each other in any direction and still maintain the close joint between them.

In order to maintain the bearing-surfaces 5 and 13 in close yielding contact with each other at all times, I employ what I term a "presser-block" 14, the same being located within the shell or casing 2 between the ball 5 on the end of the section 1 and the shoulder 15 in the section 2. The said presser-block is tubular in form and is cut away, as shown at 16, to form an annular bearing-surface which lies in constant contact with the outer surface of the ball 5 and is cut upon the same curve as the outer surface of said ball. On one side of the tubular presser-block 14 the same is provided with a plurality of longitudinally-extending fingers or projections 17. Surrounding said fingers or projections are coil-springs 18, which bear against the body portion of the tubular presser-block 14 at one end and against the shoulder 15 inside the section 2 at the other end. The said springs 18 tend to force the presser-block outwardly into contact with the ball 5, and the latter maintains said ball 5 in constant yielding contact with the bearing-surface 13 of the cap 3.

Now it will be observed from the foregoing description that the section 1 of the coupling is free to be turned in any direction with respect to the section 2, but that by reason of the fact that the ball 5 of the section 1 is constantly acted upon by the springs 18 through the medium of the tubular presser-block 14 said ball 5 is maintained in constant yielding contact with the bearing-surface 13. It is impossible for the ball 5 to become separated from the bearing-surface 13, and consequently it is impossible for any moisture to gain access to the bearing-surface 13 or the corresponding surface of the ball 5. Danger of rusting or corroding the two parts of the device at the joint is therefore effectually avoided. This is an important consideration in a device of this kind, because if the bearing-surfaces of the parts should become rusted or corroded they would become separated from each other, and a leaky joint would result. Furthermore, as the bearing-surfaces of the two parts of the device are maintained in constant yielding contact any water, dust, or other foreign substance which might come in contact with the exposed portion of the ball 5 will be effectually wiped therefrom during the movement of one section upon the other. These results are all obtained by reason of the provision of the springs 18 and the parts which coöperate therewith.

It will be noted that the tubular presser-block 14 is of smaller diameter than the shell or casing 2, in which the same is located, so that said presser-block is capable of a certain amount of lateral movement in said casing. This construction is provided so that in the event of greater wear at one point of contact between the two coupling-sections than at another the said presser-block, through the action of the springs 18, will be enabled to move so as to compensate for and take up said wear.

In Fig. 4 of the drawings I show what I term a "duplex" form of coupling, in which two ball sections 1 and 1ª, similar in all respects to ball-sections heretofore described are connected to each other, with provision for universal movement. In connection with these parts I employ a shell or casing in which the balls or spherical enlargements 5 and 5ª fit. Said shell or casing is made in two parts 19 20, the said parts being connected to each other by the bolts 21, which pass through the ears 22, formed around the outer edge of each of said parts. The parts 19 and 20 are both formed with annular bearing-surfaces 23 24, corresponding in all respects with the bearing-surface 13, heretofore referred to, and having coöperating therewith the exterior surfaces of the balls 5 and 5ª, respectively. Located within the shell or casing referred to and disposed between the contiguous balls 5 and 5ª of the sections 1 and 1ª are the presser-blocks 14 and 25. The presser-block 14 is similar in all respects to that shown in Fig. 1 of the drawings, being provided with an annular concave bearing-surface 16, which lies in constant contact with the exterior of the ball 5ª. The same is also provided with fingers or projections 17, surrounded by the coil-springs 18. The presser-block 25 is similar to the presser-block 14, but is not provided with the fingers or projections 17. It has, however, an annular curved bearing-surface 16ª thereon, which is of the same curvature as the exterior surface of the ball 5 and lies in constant contact therewith. The springs 18 are located between the presser-blocks 14 and 25 and act upon the same in opposite directions. The result is that said springs tend constantly to separate the presser-blocks 14 and 25 and to maintain the exterior surfaces of the balls 5 and 5ª in constant contact with the bearing-surfaces 23 and 24, respectively. The operation of this form of my invention is similar in all respects to the preferred form illustrated in Figs. 1, 2, and 3 of the drawings and heretofore specifically described.

In Fig. 6 of the drawings I have shown four fingers or projections 17 on the presser-block 14, whereas in Fig. 3 of the drawings I have shown but two of said fingers or projections. It is obvious that I may employ any number of said fingers or projections that may be desired or found expedient.

In order to provide a close joint between the two parts 19 and 20 of the casing shown in Fig. 4 of the drawings, I rabbet both of said parts along their meeting faces to form in the part 20 an annular groove or depression 26 and on the part 19 an annular rib or tongue 27, which lies within said groove. These parts are so shaped and proportioned as to produce a tight fit and prevent leakage into or from said casing.

The pressure exerted by the springs 18 on the balls of the coupling-sections may be varied by increasing or decreasing the number or strength of said springs or by employing a washer or washers 28 on the fingers 17 of the presser-block 14.

Having now described my invention, what

I claim as new, and desire to secure by Letters Patent, is—

1. In a pipe-coupling of the ball-and-socket type, a hollow ball or spherical portion on one of the parts, an annular bearing-surface on the other of the parts having the same curvature as said ball, a tubular presser-block, located out of guiding contact with, and capable of lateral movement in, the part in which it is mounted, and having an annular concave surface in contact with said ball, and a plurality of springs acting upon said presser-block around the edges thereof for maintaining said ball in constant contact with said bearing-surface.

2. In a pipe-coupling of the ball-and-socket type, a hollow ball or spherical portion on one of the parts, an annular bearing-surface on the other of the parts having the same curvature as said ball, a tubular presser-block in contact with said ball, located out of guiding contact with, and capable of lateral movement in, the part in which it is mounted, and provided with longitudinally-extending fingers or projections around the outer edges thereof and coil-springs surrounding said fingers or projections and acting upon said presser-block and said ball to maintain the latter in constant contact with said bearing-surface.

3. In a pipe-coupling, the combination with a shell or casing having annular bearing-surfaces at two points, and two coupling-sections having balls or spherical enlargements thereon located within said shell or casing, of two tubular presser-blocks located within but out of guiding contact with said shell or casing between said balls, each of which is provided with an annular concave surface which lies in contact with one of said balls, and a plurality of springs arranged around the outer edges of said presser-blocks and acting thereon for forcing the same apart and maintaining said balls in constant contact with said bearing-surfaces.

4. In a pipe-coupling, the combination with a shell or casing having annular bearing-surfaces at two points, and two coupling-sections having balls or spherical enlargements thereon located within said shell or casing, of two tubular presser-blocks located within said shell or casing between said balls, one of said blocks having longitudinally-extending fingers or projections thereon, and coil-springs surrounding said fingers or projections and acting upon said blocks in opposite directions to force the same apart and maintain said balls in constant contact with said bearing-surfaces.

In testimony whereof I have hereunto set my hand in presence of two subscribing witnesses.

JOHN J. REILLY.

Witnesses:
WM. M. STOCKBRIDGE,
EWELL C. DICK.